США Patent [19]

Oda

[11] Patent Number: 4,854,686
[45] Date of Patent: Aug. 8, 1989

[54] APOCHROMAT TYPE OBJECTIVE LENSES

[75] Inventor: Minoru Oda, Hoygo, Japan

[73] Assignee: Mitsubishi Denki Kabushiki Kaisha, Tokyo, Japan

[21] Appl. No.: 190,111

[22] Filed: May 5, 1988

[30] Foreign Application Priority Data

Jun. 5, 1987 [JP]  Japan .................................. 62-141851

[51] Int. Cl.$^4$ .......................... G02B 13/02; G02B 9/36
[52] U.S. Cl. .................................................... 350/456
[58] Field of Search ......................................... 350/456

[56]  References Cited

U.S. PATENT DOCUMENTS 2,832,263  4/1958  Cook .................................... 350/456

Primary Examiner—Bruce Y. Arnold
Assistant Examiner—Rebecca D. Gass
Attorney, Agent, or Firm—Bernard, Rothwell & Brown

[57]  ABSTRACT

An apochromat type objective lens, which is applied to astronomical telescope; a telephoto lens for cameras or the like, comprising a semiapochromatic convex first lens system composed of two lenses in one group comprising a convex lens and a concave lens, and an achromatic concave second lens system composed of two lenses in one group comprising a concave lens and a convex lens, which is arranged in a spaced apart relation behind the semiapochromatic first lens system; the first and second lens systems being fulfilled with the condition below:

$$\frac{K_2}{K_1} = \frac{f_1 \cdot f_2}{(f_1 - L)^2}$$

where,
f, f: the focal length of the first and second lens systems,
K, K: the proportion of the residual secondary chromatic aberration of the first and second lens systems, and
L: the mutual spacing between respective lens systems.

4 Claims, 2 Drawing Sheets

APOCHROMAT TYPE OBJECTIVE LENSES

BACKGROUND OF THE INVENTION

1. Field of the Invention

This invention relates to an apochromat type objective lenses used as a lens for an astronomical telescope, a photographic telephoto lens and the like.

2. Description of the Prior Art

In the past, as an achromatic lens for a telephoto lens, an achromat wherein two lenses made of two kinds of optical glasses are combined, or an apochromat wherein three or more kinds of optical glasses are used, and a secondary spectrum in achromat is removed so that focal points of line C ($\lambda = 6363$ Å), line D ($\lambda = 5893$ Å) and line F ($\lambda = 4861$ Å) are coincided have been used. The secondary spectrum in achromat termed herein is a difference of focal points between line C, F and line D. The line C, line D and line F are a rift in solar spectrum, which is a Fraunhofer dark line. These dark lines are present in orange color, yellow and dark blue. The aforesaid apochromat is much smaller in residual chromatic aberration i.e. secondary spectrum than the aforesaid achromat and excellent in resolving power, while it is extremely difficult to manufacture and is expensive.

In view of the foregoing, recently, there has been proposed that a low-dispersion optical glass or a new kind be used to produce a lens which has a performance close to the apochromat in terms of the residual chromatic aberration while it is an achromat in terms of construction, which lens is called a semiapochromat lens. The lens of this kind has its residual chromatic aberration which is about one-several of an ordinary achromat, and can be used to produce a telephoto lens of good quality up to an aperture about 10 cm of an aperture. FIG. 1 shows a typical trend of residual chromatic aberrations of the aforementioned various lenses.

Since the conventional apochromat is constructed as described above, it is very difficult to manufacture a lens which is small in residual chromatic aberration and excellent in resolving power by three kinds of optical glasses and in addition, it is very expensive.

Moreover, in the case of an aforesaid semiapochromat lens, and it is strongly required that the larger the aperture and the smaller the aperture ratio is, the smaller the residual chromatic aberration must be. Therefore, it is extremely difficult to produce a telephoto lens of large-aperture, compact size and high performance.

That is, in the semiapochromat lens, the maximum available aperture is about 10 cm for a focal length of 1 m. If the aperture is set to 15 cm, the focal length should be 2 m or more in order to provide a lens of good quality.

Accordingly, as described above, in the semiapochromat lens using a low-dispersion optical glass, there was a problem in that a compact and practical high performance telephoto lens having an aperture more than 15 cm cannot be obtained.

SUMMARY OF THE INVENTION

This invention has been achieved to solve the above-described problems. It is an object of the invention to provide apochromat type objective lenses which can inexpensively construct a large-aperture, compact and high performance telephoto lens by addition of a simple lens system to a semiapochromat lens.

An apochromat type objective lens according to this invention comprises a semiapochromatic convergent first lens system composed of two lenses in one group consisting of a convex lens and a concave lens, and an achromatic divergent second lens system composed of two lenses in one group arranged behind said semiapochromatic convergent lens system in a spaced apart relation. The following condition is fulfilled to correct the residual chromatic aberration of the semiapochromatic first lens system:

$$\frac{K_2}{K_1} = \frac{f_1 f_2}{(f_1 - L)^2}$$

where, $f_1$, $f_2$: the focal length of the respective lens systems i.e. semiapochromatic first system and achromatic second system $K_1$, $K_2$: the proportion of the residual chromatic aberration of respective lens systems $L$: the mutual spacing between respective lens systems

DETAILED DESCRIPTION OF THE PREFERRED EMBODIMENT

Figure 2:
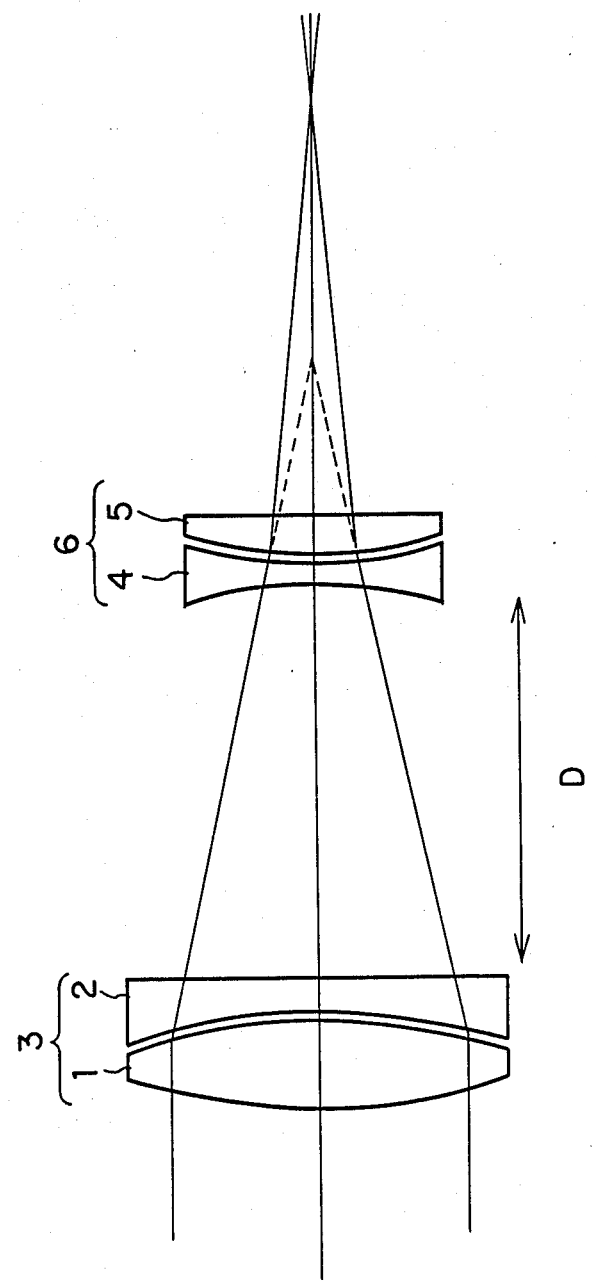
FIG. 2 is a view of a schematic structure of one embodiment of an apochromat type objective lens according to the present invention.

One embodiment of this invention will be described hereinafter with reference to FIG. 2.

In the drawing, reference numeral 1 designates a convex lens of a first group lens system (a semiapochromatic lens system), 2 a concave lens of the first lens system arranged at the rear of the convex lens 1, 3 a semiapochromat convergent lens system composed of a two-lens one group lens consisting of the convex lens 1 of the first lens system and the concave lens 2, 4 a concave lens of a second group lens system (achromatic lens system) arranged behind the semiapochromatic convergent lens system 3 in spaced apart relation, and 5 a concave lens of the second group lens system arranged at the back close to the concave lens 4, the concave lens 4 of the second group lens system and the divergent lens 5 constituting a two-lens one group lens to form an achromatic concave lens system 6.

With this arrangement, the apochromatic lens according to this invention is composed of the semiapochromatic convergent lens system 3 and the achromatic concave lens system 6.

In such an apochromatic lens, the combined focal length of the semiapochromatic convergent lens system 3 is indicated as $f_1$, the proportion of the residual chromatic aberration as $K_1$, the combined focal length of the achromatic convergent lens system 6 as $f_2$, and the proportion of the secondary residual chromatic aberration to the focal length as $K_2$.

In the above-described residual chromatic aberration, for example, the focal length of line C is made equal to that of line F, which are indicated at $f_{C,F}$ and the focal length $f_D$ with respect to line D. Then, K which involves $K_1$ and $K_2$ is defined by $$K = \frac{f_{C,F} - f_D}{f_D} \quad (1)$$

It is noted that the definition of the formula (1) is provided for the convenience's sake of explanation. With respect to the assignment of said line C, D, and $f_F$, the wavelengths of an object for correction of chromatic aberration differ with the purpose of use of the lens, and therefore the definition of the formula (1) is not limited.

Let L be the lens spacing between the semiapochromatic convergent lens system 3 and the achromatic divergent lens system 6. The condition wherein the focal points are coincided with three wavelengths of the line C, D and F, and the on-the-axis chromatic aberration is corrected may be obtained by $$\frac{K_2}{K_1} = \frac{f_1 f_2}{(f_1 - L)^2} \quad (2)$$

By fulfilling this condition, the convex lens 1 and the concave lens 2 in the first group lens system constitute the semiapochromatic convex lens system 3 which can be individually used.

By the combination of the semiapochromatic convergent lens system 3 and the achromatic divergent lens system 6 arranged therebehind in a spaced apart relation, an apochromatic lens having a longer focal length than that of the individual use of the semiapochromatic convergent lens system 3 is constituted.

As a concrete numeric example, a study is made of an example below:

$$f_1 = 1, f_2 = 1, K_2/K_1 = 5 \quad (3)$$

then, $$L = 0.553 \quad (4)$$

The proportion M of the extension of the focal length by the achromat divergent lens system 6 is $$M = 1.81 \quad (5)$$

which is practically suitable number. This comes to a reduction of overall length of the lens system with respect to the effective focal length.

As the practically advantageous numeric relation, it is preferable that $L/f_1$ is more or less than 0.5. This condition may be fulfilled by $$0.3 < \sqrt{\frac{K_1}{K_2} \cdot \frac{f_2}{f_1}} < 0.7 \quad (6)$$

When $L/f_1$ comes close to 1, the achromatic divergent lens system 6 can be advantageously miniaturized but it comes close to a so-called barrow lens, and the magnific chromatic aberration (magnific aberration of line D with respect to line C and F) increases.

If $L/f_1$ is excessively small, a lens comes too close to an ordinary apochromat lens, and the achromatic divergent lens system 6 become large. Therefore, economical merit is lost and the reduction in the overall length is also lost.

Moreover, by the arrangement of the semiapochromatic convergent lens system 3 and the achromatic divergent lens system 6 in a spaced apart relation to some extent, freedom of correction of various out-of-axis aberrations is obtained. In view of the foregoing, $L/f_1$ is preferably not extremely close to 0 or 1.

Figure 1:
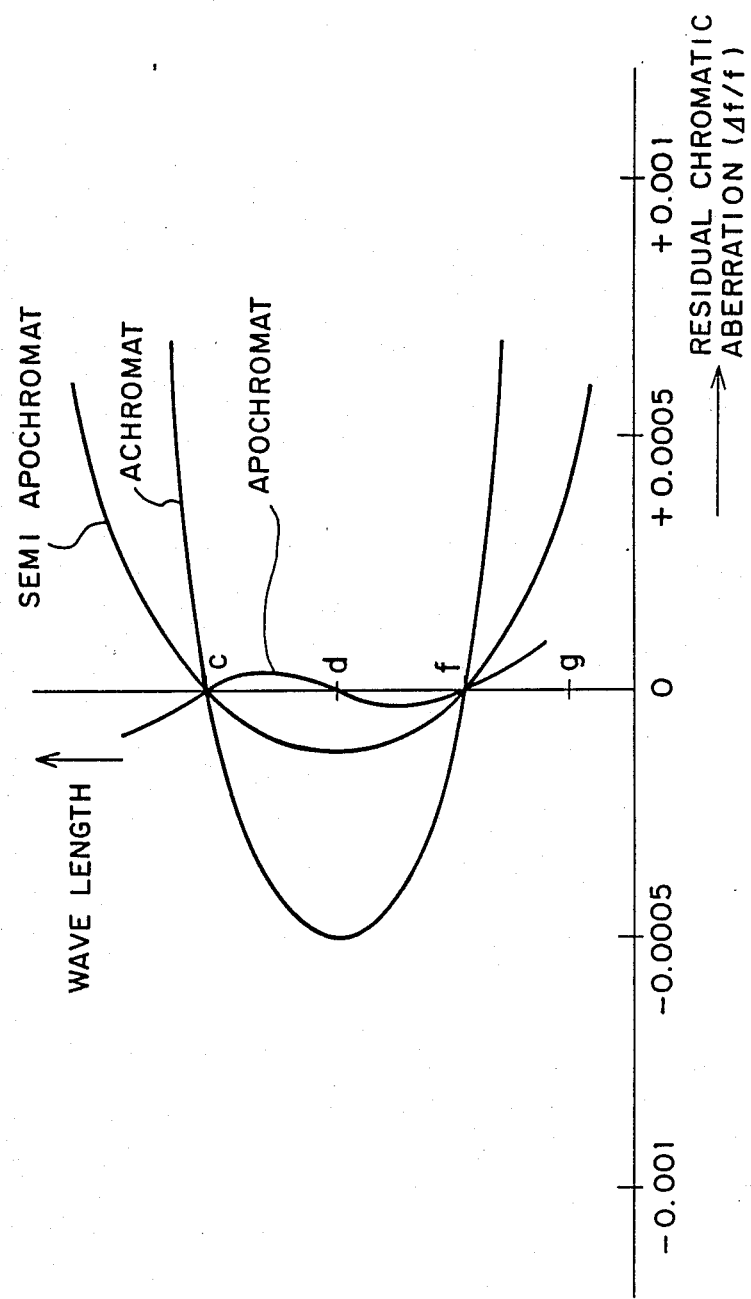
FIG. 1 is a diagram illustrating typical comparative residual chromatic aberrations of various types of telephoto lenses.

The convex lens 1 and concave lens 2 in the semiapochromatic convex lens system 3 and the concave lens 4 and convex lens 5 in the achromatic divergent lens system 6 are arranged in the order as shown in FIG. 1, that is, in the order of convex, concave, concave and convex from the leftside the semiapochromatic convergent lens system 3 and the achromatic divergent lens system 6 being reversed from each other in alignment of lenses.

This is the condition required to make possible the correction of the primary magnific chromatic aberration (magnific chromatic aberration between line C and line F). The correction can be made by adjustment of the mutual spacing between the concave lens 4 and the convex lens 5 in the achromatic divergent lens system 6. It is noted that the alignment of lenses in the semiapochromatic convergent lens system 3 and the achromatic concave lens system 6 can be reversed from that shown in FIG. 1, that is, in the order of concave, convex, convex and concave from the leftside. In short, if the lens alignment is made reversely between the semiapochromatic divergent lens system 3 and the achromatic concave lens system 6, a similar operation and effect are obtained.

The operation will be described hereinafter.

The residual chromatic aberration of the semiapochromatic convergent lens system 3 is corrected by the achromaic divergent lens system 6 arranged at the rear of the semiapochromatic convergent lens system 3 to extend the focal length of the semiapochromatic convergent lens system 3.

The primary magnific chromatic aberration is corrected by adjustment of mutual spacing between the concave lens 4 and the convex lens 5 in the achromatic divergent lens system 6.

As described above, according to the present invention, it is so designed that the achromatic divergent lens system is arranged at the rear of the semiapochromatic convergent lens system in a spaced apart relation, and therefore, the achromatic divergent lens system is extremely inexpensive as compared with the semiapochromatic convex lens system; the secondary residual chromatic aberration of the semiapochromatic convergent lens system is positively corrected by the achromatic divergent lens system and the focal length is extended, thus providing the effect that a large aperture, compact and high performance telephoto lens can be fabricated at less cost. Moreover, there is a further effect that the correction of the various out-of-axis aberrations can be advantageously made as compared with the conventional apochromatic system lens group. Furthermore, this can be applied to innovation of an already existing semiapochromat lens, and the achromatic divergent lens system which is the second group lens system can be mounted and removed to thereby switch the long focal apochromat to the short focal semiapochromat for use, thus obtaining greater versatility.

What is claimed is:

1. An apochromat type objective lens comprising a semiapochromatic first lens system composed of a two-lens one group lens comprising a convex lens and a concave lens, and an achromatic second lens system composed of a two-lens one group lens comprising a concave lens and a convex lens and which is arranged at the rear of said semiapochromatic first lens system in a spaced apart relation, said semiapochromatic lens system and said achromatic lens system being fulfilled with the following condition:

$$\frac{K_2}{K_1} = \frac{f_1 \cdot f_2}{(f_1 - L)^2}$$

where,
- $f_1, f_2$: the focal length of said first and second lens systems,
- $K_1, K_2$: the proportion of residual secondary chromatic aberration of said first and second lens systems, and
- $L$: the mutual spacing between respective lens systems.

2. The apochromat type objective lens according to claim 1, wherein the following condition is fulfilled:

$$0.3 < \sqrt{\frac{K_1}{K_2} \cdot \frac{f_2}{f_1}} < 0.7$$

3. The apochromat type objective lens according to claim 1, wherein the order of arrangement of convex and concave of lenses in said achromatic second lens system is reversed with respect to the order of arrangement of convex and concave lenses in said semiapochromatic first lens system.

4. The apochromat type objective lens according to claim 1, wherein the following condition is fulfilled:

$$0.3 < \sqrt{\frac{K_1}{K_2} \cdot \frac{f_2}{f_1}} < 0.7$$

* * * * *

UNITED STATES PATENT AND TRADEMARK OFFICE
CERTIFICATE OF CORRECTION

PATENT NO.   : 4,854,686
DATED        : August 8, 1989
INVENTOR(S)  : MINORU ODA It is certified that error appears in the above-identified patent and that said Letters Patent is hereby corrected as shown below:

```
Front Page, Col. 1, [57], line 1, after "to" insert --an--;
Front Page, Col. 1, [57], line 2, ";" should be --,--.
Front Page, Col. 2, line 1, delete "convex";
Front Page, Col. 2, line 4, delete "concave".
Col. 1, line 28, "or" should be --of--;
Col. 1, line 36, delete "of an";
Col. 1, line 37, delete "aperture".
Col. 2, line 48, "concave" should be --convex--;
Col. 2, line 51, "divergent" should be --convex--;
Col. 2, line 52, "concave" should be --divergent--;
Col. 2, line 56, "concave" should be --divergent--;
Col. 2, line 61, "convergent" should be --divergent--.
Col. 3, line 24, "convex" should be --convergent--.
Col. 4, line 5, "convex" should be --convergent--;
Col. 4, line 9, after "leftside" insert --,--;
Col. 4, line 21, "concave" should be --divergent--;
Col. 4, line 25, "divergent" should be --convergent--;
Col. 4, line 26, "concave" should be --divergent--;
Col. 4, line 31, "achromaic" should be --achromatic--;
Col. 4, line 45, "convex" should be --convergent--.
```

Signed and Sealed this

Eleventh Day of December, 1990

Attest:

HARRY F. MANBECK, JR.

*Attesting Officer*     *Commissioner of Patents and Trademarks*